United States Patent
Matthews et al.

(10) Patent No.: US 10,529,336 B1
(45) Date of Patent: Jan. 7, 2020

(54) FILTERING SENSITIVE INFORMATION

(71) Applicant: Amazon Technologies, Inc., Seattle, WA (US)

(72) Inventors: Nicholas Channing Matthews, Atlanta, GA (US); Jeddel Yeras, Edgewood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 9 days.

(21) Appl. No.: 15/703,662

(22) Filed: Sep. 13, 2017

(51) Int. Cl.
| | | |
|---|---|---|
| *G10L 15/00* | (2013.01) | |
| *G10L 15/26* | (2006.01) | |
| *H04M 1/27* | (2006.01) | |
| *G06F 21/50* | (2013.01) | |
| *H04M 3/493* | (2006.01) | |
| *G06F 16/635* | (2019.01) | |
| *G06Q 30/00* | (2012.01) | |

(52) U.S. Cl.
CPC .......... *G10L 15/26* (2013.01); *G06F 16/635* (2019.01); *G06F 21/50* (2013.01); *H04M 1/271* (2013.01); *H04M 3/4936* (2013.01); *G06Q 30/016* (2013.01)

(58) Field of Classification Search
CPC ...... G10L 15/26; G10L 17/26; G06F 21/6245

USPC ......................................................... 704/250
See application file for complete search history.

(56) References Cited

U.S. PATENT DOCUMENTS

| | | | | |
|---|---|---|---|---|
| 9,201,965 B1* | 12/2015 | Gannu | ............. | G06F 17/30761 |
| 9,787,835 B1* | 10/2017 | Pycko | ................. | H04M 3/5166 |
| 2006/0089857 A1* | 4/2006 | Zimmerman | ....... | G06F 21/6245 |
| | | | | 705/2 |
| 2006/0190263 A1* | 8/2006 | Finke | ..................... | G06Q 50/22 |
| | | | | 704/270 |
| 2007/0016419 A1* | 1/2007 | Lee | ......................... | G10L 15/26 |
| | | | | 704/250 |
| 2008/0037719 A1* | 2/2008 | Doren | ..................... | G10L 21/00 |
| | | | | 379/85 |
| 2008/0221882 A1* | 9/2008 | Bundock | ................ | G10L 15/26 |
| | | | | 704/235 |

\* cited by examiner

*Primary Examiner* — Daniel Abebe
(74) *Attorney, Agent, or Firm* — Thorpe North & Western, LLP.

(57) ABSTRACT

Technology is described for removing sensitive information. An audio block that represents a portion of a conversation may be identified. A text representation for the audio block may be obtained using a speech-to-text process. The text representation for the audio block may be compared to pattern rules to mark sensitive information in the audio block. A portion of audio data from the audio block marked as sensitive information may be removed in the audio block.

20 Claims, 11 Drawing Sheets

FILTERING SENSITIVE INFORMATION

BACKGROUND

Call centers may be used to interact with a large volume of customers. Call centers may support communication with customers over a wired or wireless communication network. For example, call centers may communicate with customers via voice calling, video, text chat, instant messaging, etc. In one example, an inbound call center may be operated by a company to administer product support, handle inquiries from consumers, etc., whereas an outbound call center may be operated for telemarketing, solicitation of charitable or political donations, debt collection, market research, etc.

In one example, call centers may obtain audio conversations (from audio or video) with customers for compliance and training purposes. For example, call centers may wish to record the audio conversations to ensure the employees of the call center are effective in dealing with the concerns of the customers. The audio conversations in an electronic format may be used by call center managers to grade a competency level, technical skill level, affability, etc., for the employees that work in the call center, as well as evaluate a satisfaction level of the customers that interacted with the employees of the call center.

DETAILED DESCRIPTION

Figure 1:
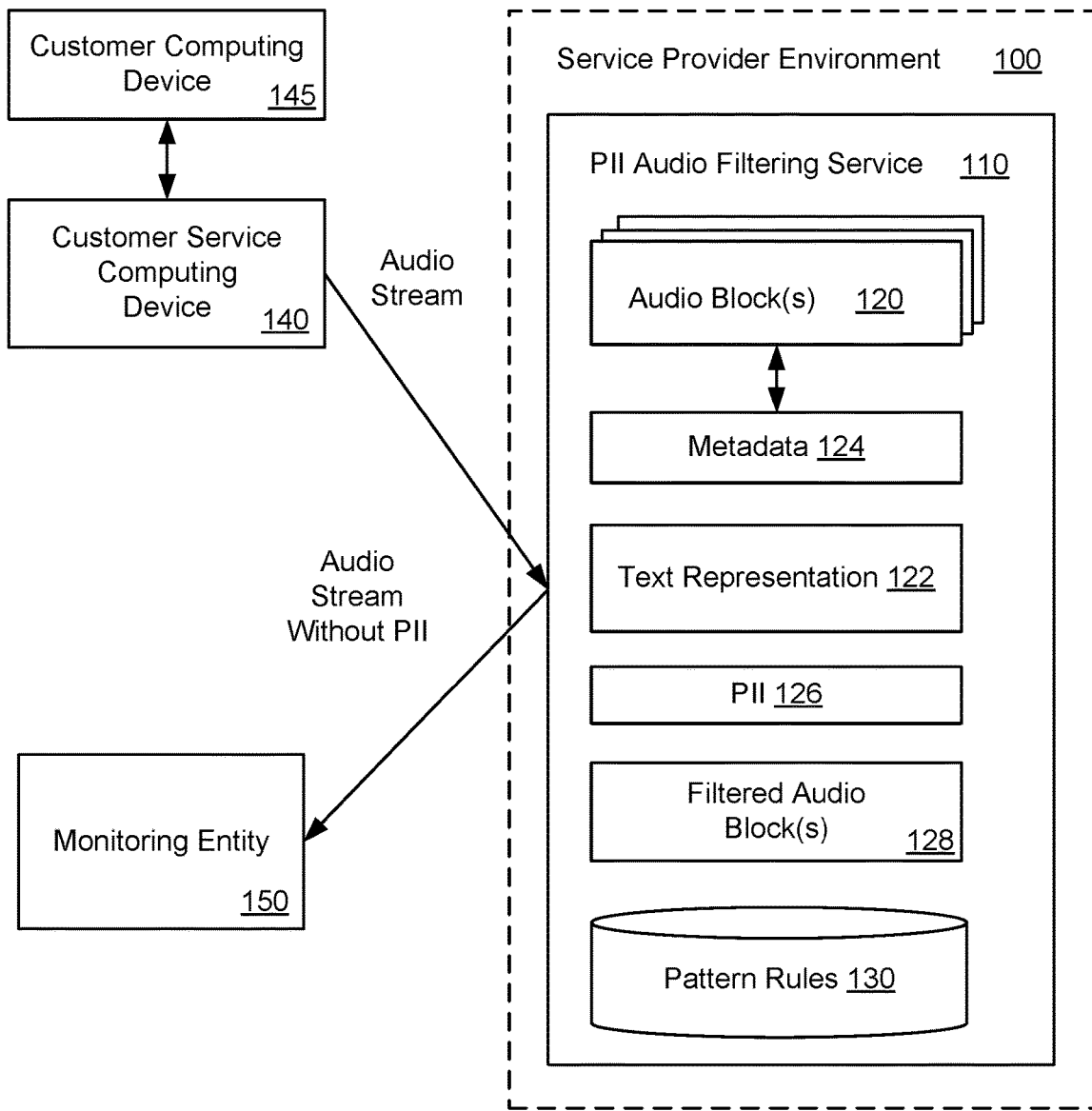
FIG. 1 illustrates a system and related operations for removing personally identifiable information (PII) from audio data according to an example of the present technology.

A technology is described for removing or filtering target information from audio source data. The target information may include any information to be removed or filtered from the audio source data. The target information may include sensitive information, such as personally identifiable information (PII), from audio source data. A service (e.g., a sensitive information filtering service) may identify a plurality of audio blocks in the audio source data. The audio source data may be standalone audio source data from an audio call, or the audio source data may be part of a video call, audio-visual data or multimedia data. The service may generate a text representation for an audio block from the plurality of audio blocks using a speech-to-text service or application. The service may compare the text representation for the audio block to pattern rules to identify sensitive information in the audio block. A portion of audio data that corresponds to the sensitive information may be filtered from the audio block. The service may provide audio block(s) without the sensitive information to a monitoring entity to enable quality assurance to be performed for the audio data. As a result, the sensitive information associated with a customer associated with the audio source data may not be exposed to the monitoring entity.

In one configuration, the service may receive audio source data of an ongoing conversation. For example, the service may receive the audio source data in the form of a real-time audio stream of an ongoing conversation that is occurring between at least two parties. As a non-limiting example, the ongoing conversation may be related to a customer service call, and the parties involved in the customer service call may include a customer and a customer service representative. The audio source data of the ongoing conversation may be captured at computing device(s) (e.g., recording or capture devices) associated with the customer service representative, and the audio source data may be provided as the audio stream from the computing device(s) to the service. The service may receive the audio stream of audio source data and divide the audio stream into a plurality of audio blocks in sequence, and each audio block may represent a time period of the ongoing conversation (e.g., 1 second, 2 seconds, 5 seconds, etc.).

In one example, the service may generate or obtain a text representation for an audio block in the plurality of audio blocks. The text representation may be a transcript of the conversation between the parties that occurred during the corresponding audio block. Thus, the text representation of the audio block may include words, phrases, numbers, etc. that were spoken between the parties involved in the conversation.

In one example, the service may analyze the text representation of the audio block to generate metadata for the audio block. The metadata may include timestamps for at least one word, phrase and/or number in the audio block, as indicated by the text representation for the audio block. In one example, the timestamps may be for all words, phrases and/or numbers in the audio block, and may not be limited to only timestamps for sensitive information in the audio block. In addition, the metadata for the audio block may further include an audio block identifier, a customer identifier, a call identifier, and/or confidence scores for each word, phrase or number included in the audio block.

In one configuration, the service may compare the text representation for the audio block to pattern rules (e.g., regex rules or regex patterns) to identify sensitive information of a customer in the audio block, such as a name, address, telephone number, email address, credit card number, social security number, payment information, etc. The pattern rules may be able to detect certain patterns of words, phrases and/or numbers that are indicative of sensitive information. When certain patterns of words, phrases and/or numbers are identified in the text representation, a corresponding portion of audio data in the audio block may be flagged or marked as likely having sensitive information. For example, the corresponding portion of audio data may be flagged by setting a flag in the audio block. A timestamp that corresponds to the sensitive information may be identified in the metadata for the audio block.

In one example, the service may remove or filter out the portion of audio data from the audio block that corresponds to the sensitive information in the audio block. The service may remove the portion of audio data identified with the timestamp for the sensitive information in the audio block, while portions of audio data that do not include sensitive information may remain in the audio block. Alternatively, the service may remove an entire audio block that contains sensitive information (as opposed to a portion of the audio block). The service may remove or filter sensitive information from each of the plurality of audio blocks associated with the audio stream while the ongoing conversation is occurring between the parties, and the service may provide the plurality of audio blocks without the sensitive information to the monitoring entity to enable the monitoring entity to perform quality assurance for the audio stream in near real-time.

FIG. 1 illustrates an exemplary system and related operations for removing personally identifiable information (PII) 126 from audio source data using a PII audio filtering service 110 that operates in a service provider environment 100. In a first stage, the PII audio filtering service 110 may receive an audio stream from a customer service computing device 140. The audio stream may include audio source data from an ongoing conversation between a customer service representative associated with the customer service computing device 140 and a customer associated with a customer computing device 145. An audio conversation stored in another location may also be used to create the audio stream by streaming the stored audio conversation. The PII audio filtering service 110 may segment the audio stream into multiple audio blocks 120 which each have a defined duration.

In one example, in a second stage, the PII audio filtering service 110 may generate a text representation 122 for an audio block 120 using a speech-to-text application. The text representation 122 may be a transcript of the conversation that occurred between the customer service representative and the customer during the audio block 120. In a third stage, the PII audio filtering service 110 may analyze the text representation 122 for individual audio blocks 120 to generate metadata 124 for the audio block 120. The metadata 124 may include timestamps for at least one word, phrase and/or number in the audio block 120.

In one example, in a fourth stage, the PII audio filtering service 110 may compare the text representation 122 for the audio block 120 to pattern rules 130 (e.g., regex rules or regex patterns) to identify PII 126 in the audio block 120. The pattern rules 130 may be able to identify certain patterns of words, phrases and/or numbers that are indicative of PII 126. When these certain patterns of words, phrases and/or numbers are detected in the text representation 122, the corresponding portion of audio data in the audio block 120 may be marked or flagged as likely having PII 126. In addition, a timestamp for the PII 126 in the audio block 120 may be identified or marked in the metadata 124 for the audio block 120.

In one example, in a fifth stage, the PII audio filtering service 110 may filter or remove a portion of audio data from the audio block 120 that corresponds to the PII 126 in the audio block 120. The portion of audio data may be removed in accordance with the timestamp for the PII 126 in the audio block 120. The PII audio filtering service 110 may create filtered audio blocks 128 that do not contain the PII 126. In addition, in a sixth stage, the PII audio filtering service 110 may provide the filtered audio blocks 128 to a monitoring entity 150 to enable the monitoring entity 150 to perform quality assurance for the audio stream without exposure to the PII 126.

As a non-limiting example, the PII audio filtering service 110 may receive an audio stream from the customer service computing device 140. The PII audio filtering service 110 may divide the audio stream that is being received into separate, sequential audio blocks 120 (e.g., each audio block 120 may be 5 seconds in duration). A text representation 122 and metadata 124 may be created for each audio block 120 in the audio stream. In addition, the PII audio filtering service 110 may compare the text representation 122 for each audio block 120 to the pattern rules 130, and in this particular example, the PII audio filtering service 110 may identify audio blocks 3, 4, 5, 10 and 11 (in a series of audio blocks 120) that include PII 126 (e.g., credit card information, social security number). Based on the metadata 124 for each audio block 120, the PII audio filtering service 110 may determine timestamps for the instances of PII 126 in the audio blocks 3, 4, 5, 10 and 11. The PII audio filtering service 110 may remove the PII 126 from the audio blocks 3, 4, 5, 10 and 11 in accordance with the timestamps for the instances of PII 126 in the audio blocks 3, 4, 5, 10 and 11. Alternatively, the PII audio filtering service 110 may mark or flag entire audio blocks 120 (e.g., audio blocks 3, 4, 5, 10 and 11) in the audio stream as containing PII 126, and the PII audio filtering service 110 may remove the entire audio blocks 120 to eliminate the corresponding PII 126.

In the past, call centers have generated audio recordings of customer service calls for quality assurance, compliance and/or training purposes. These customer service calls may involve a verbal recitation of PII (e.g., credit card information), and the PII may be included in the audio recordings. When the audio recordings have included PII, the audio recordings may be subject to strict government and ethical compliance requirements. However, since the PII may not be relevant for the purposes of compliance and training, it may be beneficial to remove the PII from the audio recordings.

Figure 2:
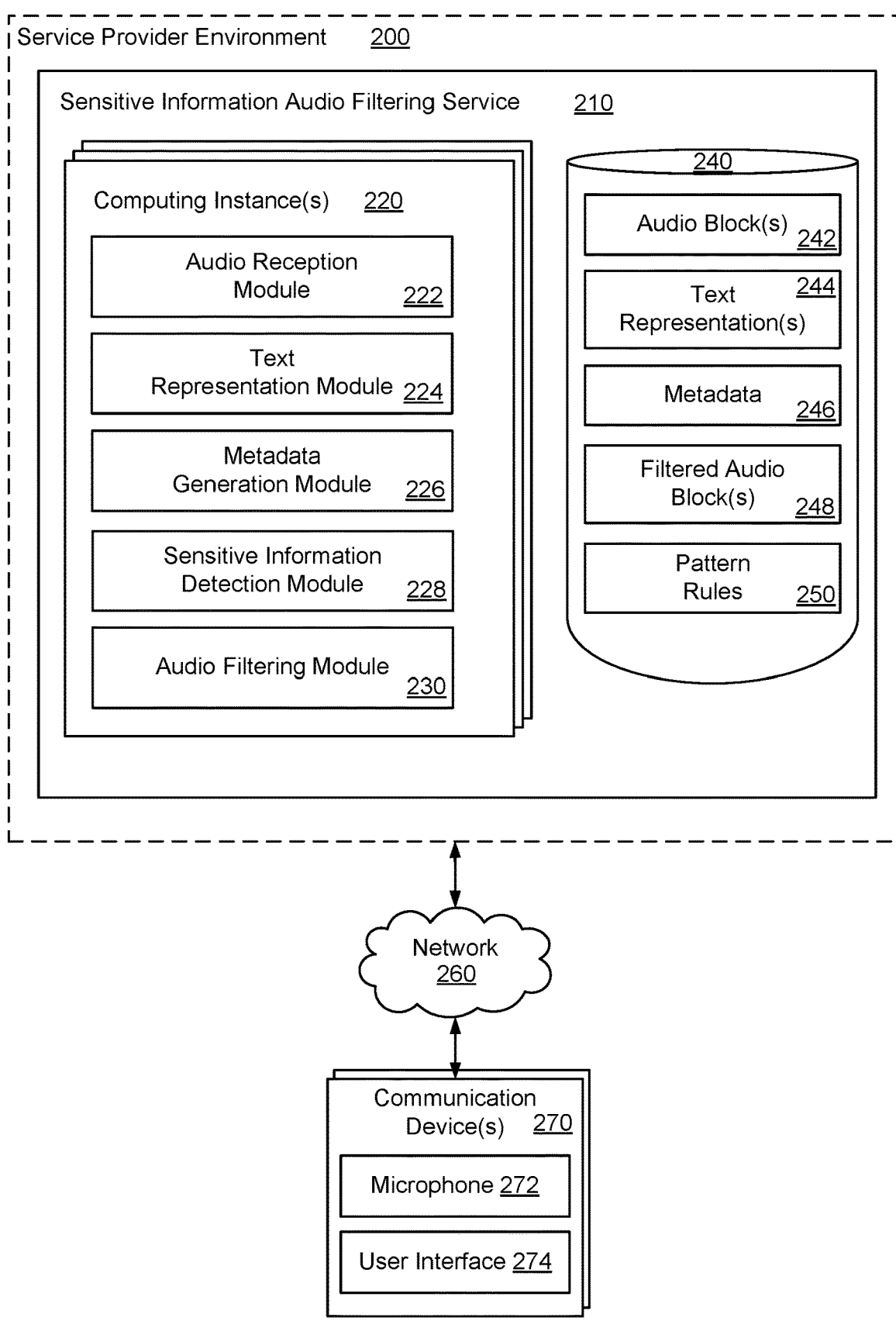
FIG. 2 is an illustration of a networked system for removing sensitive information from audio source data according to an example of the present technology.

FIG. 2 illustrates example components of the present technology in a service provider environment 200. The service provider environment 200 may operate a sensitive information audio filtering service 210. The sensitive information audio filtering service 210 may utilize one or more computing instances 220 and data store(s) 240 for removing sensitive information, such as PII, from audio blocks(s) 242 using pattern rules 250 to produce filtered audio block(s) 248. The sensitive information audio filtering service 210 may be in communication with a number of communication devices 270 over a network 260. The communication devices 270 may include plain old telephone service (POTS) phones, voice over Internet Protocol (VoIP) phones or video phones. The communication devices 270 may include a microphone 272 to capture audio data and a user interface 274. The communication devices 270 may include a customer service computing device and a customer computing device, which may be used to facilitate a conversation between a customer service representative associated with the customer service computing device and the customer associated with the customer computing device.

In one example, the data store 240 may include the audio block(s) 242. The audio blocks 242 may be created from an audio stream that is received from the communication device 270. In other words, the incoming audio stream or a stored audio file previously captured may be segmented, divided, or chunked to form the audio blocks 242. In one example, the audio blocks 242 may represent audio source data of a conversation between parties associated with the communication devices 270 or audio source data from an audio message from an individual. Each audio block 242 may each represent a certain time period of the conversation between the communication devices 270. For example, each audio block 120 may be a duration of 1 second, 2 seconds, 5 seconds, 10 seconds, 30 seconds, etc.

In one example, the data store 240 may include text representation(s) 244. The text representations 244 may be derived or generated using a speech-to-text application, speech-to-text process, speech-to-text service, speech recognition application, natural language processing, etc. A text representation 244 may be associated with each audio block 242. The text representation 244 may be a transcript of a conversation that occurred during the audio block 242. Thus, the text representation 244 may include, for the audio block 242, a listing of words, phrases, numbers, etc. that were spoken during the conversation between the parties associated with the communication devices 270.

In one example, the data store 240 may include metadata 246. Metadata 246 may be associated with each audio block 242. The metadata 246 may include timestamps for at least one word, phrase and/or number in the audio block 242, as indicated by the text representation 244 for the audio block 242. The metadata 246 for the audio block 242 may include an audio block identifier, a customer identifier, or a call identifier. The metadata 246 for the audio block 242 may also include confidence scores for words, phrases or numbers included in the audio block 242, as indicated by the text representation 244 for the audio block 242. When the confidence scores associated with the audio block 242 are below a defined level (e.g., less than 90% of confidence), the audio block 242 may be provided to a human for additional review. In addition, the metadata 246 may be deleted after a certain period of time (e.g., after the audio block 242 is completely processed to remove any sensitive information in the audio block 242).

In one example, the data store 240 may include the filtered audio block(s) 248. The filtered audio blocks 248 may include audio blocks without sensitive information (e.g., PII). In other words, the filtered audio blocks 248 may be derived after sensitive information is removed or filtered from the audio blocks 242. In one example, the filtered audio blocks 248 may be of a same duration as the audio blocks 242. For example, a 2-second audio block may be transformed into a 2-second filtered audio block. However, the filtered audio block 248 may include supplemental audio data (e.g., no sound, noise, hold music, audio tones, etc.) in place of sensitive information that has been removed or filtered from the audio block 242. Alternatively, the filtered audio blocks 248 may be truncated versions of the original audio blocks. For example, the filtered audio block may be 1.5 seconds as compared to the original 2 second audio block.

In one example, the data store 240 may include the pattern rules 250. The pattern rules 250 may include certain patterns of letters, words, phrases and/or numbers that are indicative of sensitive information. In other words, the pattern rules 250 may identify patterns, words, phrases and/or numbers that have an increased likelihood of being sensitive information, or a plurality of predefined words and phrases that have an increased likelihood of being immediately followed (or preceded) by sensitive information. The pattern rules 250 may be applied to the audio block 242 and cause certain portions of the audio block 242 to be identified or flagged as potentially containing sensitive information. The pattern rules 250 may include machine learning models (e.g., pattern recognition) that are to be applied to the audio block 242 in order to detect sensitive information. The pattern rules 250 may define that a presence of consecutive numbers may be indicative of certain types of sensitive information (e.g., a string of 9 numbers may indicate a social security number, a string of 10 numbers may indicate a telephone number, a string of 16 numbers may indicate a credit card number, a string of numbers followed by the words north, south, east or west may indicate an address).

The pattern rules 250 may include various sets of predefined rules that are to be applied to the audio block 242 depending on a context of the audio stream received from the communication device 270 (e.g., computer support, health care, financial services, retail), or the various sets of predefined rules may be applied depending on a type of sensitive information to be identified from the audio block 242. The contexts may also be specific business contexts, scientific contexts, etc. In addition, the pattern rules 250 may be updated to handle new contexts and/or new types of sensitive information to be filtered from the audio block 242. In another example, the pattern rules 250 may be regex rules or regex patterns, and there may be various regex patterns for various types of sensitive information (e.g., a social security regex, a credit card regex).

The computing instance(s) 220 operated by the sensitive information audio filtering service 210 may utilize a number of modules for removing the sensitive information from the audio blocks(s) 242 using the pattern rules 250 to produce the filtered audio block(s) 248. The computing instance(s) 220 may include an audio reception module 222, a text representation module 224, a metadata generation module 226, a sensitive information detection module 228, an audio filtering module 230, and other applications, services, processes, systems, engines, or functionality not discussed in detail herein.

The audio reception module 222 may be configured to receive audio source data of a conversation. As an example, the audio reception module 222 may receive the audio source data as a real-time audio stream of an ongoing conversation that is occurring between the communication devices 270 (e.g., the customer service computing device and the customer computing device). The source audio data of the conversation may be captured using microphone(s) 272 of the communication device(s) 270, and the audio source data may be provided as the audio stream to the audio reception module 222. The audio reception module 222 may receive the audio stream and segment the audio stream into a plurality of sequential audio blocks 242, and each audio block 242 may represent a certain time period of the ongoing conversation (e.g., 0.0.5 seconds, 1 second, 2 seconds, 5 seconds).

The text representation module 224 may be configured to generate the text representation 244 for the audio block 242 in the plurality of audio blocks 242. The text representation module 224 may utilize a speech-to-text application, speech recognition application or a related type of application to generate the text representation 244 for the audio block 242. The text representation 244 may be a transcript of the portion of the conversation that occurred during the audio block 242. Thus, the text representation module 224 may generate the text representation 244 for the audio block 242 to include words, phrases, numbers, etc. that are included in the corresponding audio block 242.

The metadata generation module 226 may be configured to analyze the text representation 244 for the audio block 242 and generate the metadata 246 for the audio block 242. For example, the metadata generation module 226 may generate the metadata 246 to include timestamps for any word, phrase and/or number in the audio block 242. The timestamps may be for any language structure (e.g., letters, words, phrases and/or numbers) in the audio block 242. In addition, the metadata generation module 226 may generate the metadata 246 to include an audio block identifier, a customer identifier, a customer service person identifier, a call identifier, and/or confidence scores for each word, phrase or number included in the audio block 242.

The sensitive information detection module 228 may be configured to compare the text representation 244 for the audio block 242 to the pattern rules 250 to identify sensitive information in the audio block 242. Based on the pattern rules 250, the sensitive information detection module 228 may detect certain words, phrases and/or numbers in the text representation 244 that are indicative of being sensitive information. When these certain words, phrases and/or numbers are detected in the text representation 244, the sensitive information detection module 228 may flag a corresponding portion of audio data in the audio block 242 as having sensitive information. The sensitive information detection module 228 may determine a timestamp for the sensitive information in the audio block 242 based on the timestamps included in the metadata 246 for the audio block 242. Alternatively, based on the pattern rules 250, the sensitive information detection module 228 may mark the entire audio block 242 as having sensitive information.

The audio filtering module 230 may be configured to remove or filter a portion of audio data from the audio block 242 that corresponds to the sensitive information to produce the filtered audio block 248. The audio filtering module 230 may remove or filter the portion of audio data in accordance with the timestamp for the sensitive information in the audio block 242, or alternatively, the audio filtering module 230 may remove or filter the entire audio block 242. In one example, the audio filtering module 230 may generate the filtered audio block 248 to include supplemental audio data, which may serve as a replacement for the sensitive information that was removed from the audio block 242.

The communication device 270 may comprise, for example a processor-based system. The communication device 270 may be a device such as, but not limited to, a desktop computer, laptop or notebook computer, tablet computer, handheld computer, workstation, network computer, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), a virtualized storage network, volatile or non-volatile RAM, optical media, or hard-drive type media. The data store may be representative of a plurality of data stores as can be appreciated.

The network 260 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
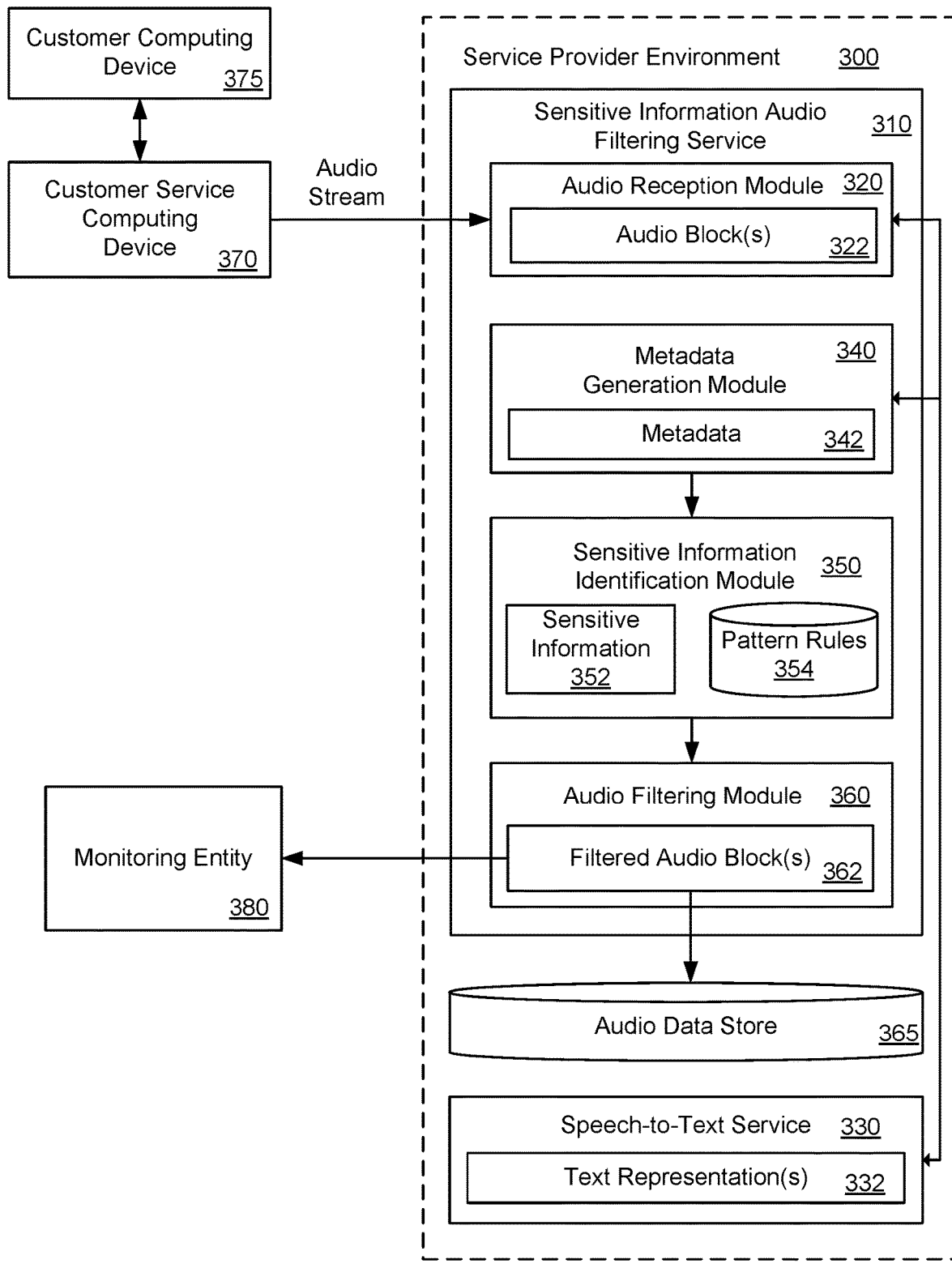
FIG. 3 illustrates a system and related operations for removing sensitive information from audio source data according to an example of the present technology.

FIG. 3 illustrates an exemplary system and related operations for removing target information, such as sensitive information 352, from audio source data using a sensitive information audio filtering service 310 that operates in a service provider environment 300. As an example, the sensitive information audio filtering service 310 may receive, via an audio reception module 320, an audio stream from a customer service computing device 370. The customer service computing device 370 may be located, for example, at a call center. The customer service computing devices 370 may be in communication with a customer computing device 375, for example, for a customer service call between a customer service representative associated with the customer service computing device 370 and a customer associated with the customer computing device 375. The customer service computing device 370 may capture an ongoing conversation between the customer service representative and the customer, and the customer service computing device 370 may provide the audio source data of the ongoing conversation as the audio stream to the audio reception module 320. In one example, the customer computing device 375 and/or the customer service computing device 370 may provide the audio source data of the ongoing conversation as the audio stream to the audio reception module 320.

In an alternative configuration, the audio reception module 320 may receive the audio stream from computing devices that are not associated with customer service calls. In other words, the audio stream may be associated with conversations between computing devices that are related to other purposes (e.g., law enforcement, insurance, banking, etc.).

In one example, the audio reception module 320 may receive the audio stream from the customer service computing device 370. The audio reception module 320 may segment or divide the audio stream into a number of sequential audio blocks 322. Each audio block 322 may represent a certain time period of the ongoing conversation (e.g., 0.5 seconds, 1 second, 2 seconds, 5 seconds or 10 seconds). The series of audio blocks 322 may have a time ordering. The audio reception module 320 may provide the number of audio blocks 322 to a speech-to-text service 330 that operates in the service provider environment 300.

In one example, the speech-to-text service 330 may generate a text representation 332 for an audio block 322 in the number of audio blocks 322. The speech-to-text service 330 may generate the text representation 332 using a speech-to-text process, an automatic speech recognition process, a natural language understanding process, deep learning algorithms, etc. The text representation 332 may be a transcript of a portion of the conversation that occurred during the corresponding audio block 322. Thus, the text representation 332 may include, for the audio block 322, words, phrases, numbers, etc. that were spoken between the customer service representative and the customer involved in the conversation.

In one example, a metadata generation module 340 in the sensitive information audio filtering service 310 may analyze the text representation 332 for the audio block 322 to generate metadata 342 for the audio block 322. The metadata 342 may include timestamps for at least one word, phrase and/or number in the audio block 322, as identified in the text representation 332 for the audio block 322. In addition, the metadata generation module 340 may identify and store an audio block identifier, a customer identifier, a call identifier, and/or confidence scores for each word, phrase or number included in the audio block 322.

In one example, a sensitive information identification module 350 in the sensitive information audio filtering service 310 may compare the text representation 332 for the audio block 322 to pattern rules 354 to identify sensitive information 352, such as personally identifiable information (PII), in the audio block 322. The pattern rules 354 may include certain patterns of words, phrases and/or numbers that are indicative of sensitive information 352. When these certain patterns of words, phrases and/or numbers are detected in the text representation 332 (e.g., a full match between a particular pattern and text content in the text representation 332), the sensitive information identification module 350 may flag a corresponding portion of audio data in the audio block 322 as likely being sensitive information 352. An example of such pattern rules 354 may be referred to as regex rules or regex patterns, and there may be separate regex patterns for various types of sensitive information 352 (e.g., a social security regex, a credit card regex). When certain regex patterns are detected in the text representation 332 (e.g. a full match between a particular regex pattern and text content in the text representation 332), the sensitive information identification module 350 may flag a corresponding portion of audio data in the audio block 322 as likely being sensitive information 352.

In one example, the sensitive information identification module 350 may flag periods of audio data that follow an utterance of certain words or phrases (e.g., "What is your name?" or "What is your date of birth?"), as indicated by the text representation 232 for the audio block 322. In another example, the sensitive information identification module 350 may utilize other techniques, such as artificial intelligence (AI) programming, to detect the sensitive information 352 in the audio block 322. In addition, the sensitive information identification module 350 may determine a timestamp for the sensitive information 352 detected in the audio block 322 based on the timestamps included in the metadata 342 for the audio block 322, or alternatively, the sensitive information identification module 350 may mark the entire audio block 322 as having sensitive information 352.

In one example, the sensitive information identification module 350 may apply different sets of pattern rules 354 depending on a context of the ongoing conversation (e.g., based on the call ID). For example, the sensitive information identification module 350 may apply a first set of pattern rules 354 for healthcare calls or a second set of pattern rules 354 for financial-related calls.

In another example, the sensitive information identification module 350 may look up likely sensitive information 352 (e.g., a credit card number) in an appropriate data store (e.g., a data store of credit card information) to verify that flagged audio data in the audio block 322 is indeed sensitive information 352. For example, the sensitive information identification module 350 may detect a 16-digit number in an audio block 322, and the sensitive information identification module 350 may flag the 16-digital number as potentially being sensitive information 352. The sensitive information identification module 350 may look up the 16-digit number in an appropriate data store to verify that the 16-digit number is indeed a credit card number and constitutes sensitive information 352.

In one example, an audio filtering module 360 may filter or remove a portion of audio data from the audio block 322 that corresponds to the sensitive information 352 in the audio block 322. The audio filtering module 360 may filter the audio block 322 to produce a filtered audio block 362. The portion of audio data may be removed in accordance with the timestamp for the sensitive information 352 in the audio block 322. Alternatively, the audio filtering module 360 may remove the entire audio block 322 when the audio block 322 is marked as having sensitive information 352.

In some cases, the filtered audio block 362 may be reprocessed to ensure that all sensitive information 352 has been removed from the filtered audio block 362. For example, the filtered audio block 362 may be provided to the speech-to-text service 330, which may generate an updated text representation for the filtered audio block 362. The metadata generation module 340 may generate updated metadata for the filtered audio block 362, and the updated metadata may indicate that the filtered audio block 362 is being validated. The sensitive information identification module 350 may compare the updated text representation for the filtered audio block 362 to the pattern rules 354 in order to identify whether there is additional sensitive information in the filtered audio block 362. If additional sensitive information is detected in the filtered audio block 362, the audio filtered module 360 may remove the additional sensitive information.

In one configuration, the audio filtering module 360 may generate the filtered audio block 362 to include supplemental audio data (e.g., no sound, noise, hold music, prerecorded message) that replaces the sensitive information 352. Therefore, the filtered audio block 362 may be a same duration as the audio block 322. The audio filtering module 360 may provide filtered audio blocks 362 (with the supplemental audio data) to a monitoring entity 380. For example, the audio filtering module 360 may provide a stream of filtered audio blocks 362 to the monitoring entity 380 that represents the ongoing conversation between the customer service representative associated with the customer service computing devices 370 and the customer associated with the customer computing device 375. The monitoring entity 380 may receive the stream of filtered audio blocks 362 and perform quality assurance for the ongoing conversation, and sensitive information 352 involved in the ongoing conversation may not be exposed to the monitoring entity 380 during the quality assurance. The monitoring entity 380 may listen to the ongoing conversation without being exposed to sensitive information 352 in near real-time, as there will be a minimal delay (e.g., 10 seconds) while a given audio block 322 is being processed to remove any sensitive information 352 in the audio block 322. This delay may be decreased when the time duration of each audio block 322 is reduced because each individual block may consume less time to process, whereas the delay may be increased when the time duration of each audio block 322 is increased due to increase in time delay for processing larger blocks.

In an alternative configuration, the audio filtering module 360 may provide the filtered audio blocks 362 (with the supplemental audio data) to an audio data store 365 in the service provider environment 300. The filtered audio blocks 362 may be accessed from the audio data store 365 at a later time for consumption. For example, a supervisor may access the filtered audio blocks 362 from the audio data store 365 at a later time to evaluate a performance of a customer service representative involved in a conversation captured by the filtered audio blocks 362.

Figure 4:
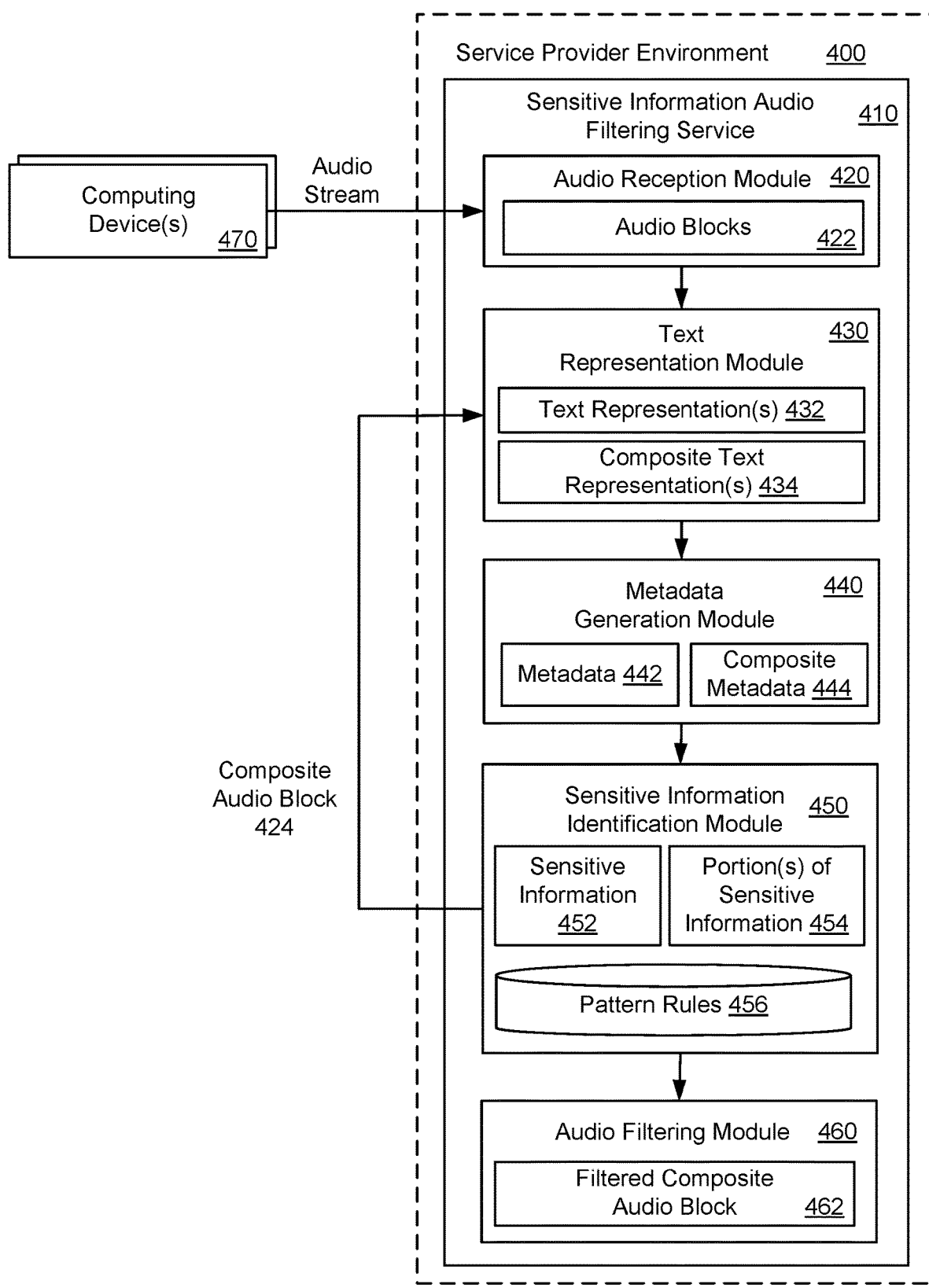
FIG. 4 illustrates a system and related operations for removing portions of sensitive information from audio source data according to an example of the present technology.

FIG. 4 illustrates an exemplary system and related operations for removing portions of sensitive information 454 from audio source data using a sensitive information audio filtering service 410 that operates in a service provider environment 400. The sensitive information audio filtering service 410 may receive, via an audio reception module 420, an audio stream from computing device(s) 470. As described earlier, a text representation module 430 (or a speech-to-text service operating in the service provider environment 400) in the sensitive information audio filtering service 410 may generate a text representation 432 for an audio block 422 in the audio stream, and a metadata generation module 440 in the sensitive information audio filtering service 410 may analyze the text representation 432 for the audio block 422 to generate metadata 442 for the audio block 422.

In one example, a sensitive information identification module 450 in the sensitive information audio filtering service 410 may compare the text representation 432 for the audio block 422 to pattern rules 456, and based on the comparison, the sensitive information identification module 450 may identify a portion of sensitive information 454 in the audio block 422. For example, the portion of sensitive information 454 may be near a beginning or an end of the audio block 422, which may imply that there is additional sensitive information in adjacent audio blocks 422 (i.e., the sensitive information encompasses multiple adjacent audio blocks). Alternatively, the portion of sensitive information 454 may encompass the entire audio block 422, which may imply that there is additional sensitive information in adjacent audio blocks 422. In this scenario, the sensitive information identification module 450 may compare text representations 432 for multiple adjacent audio blocks 422 to the pattern rules 456, and based on the comparison, the sensitive information identification module 450 may identify portions of sensitive information 454 in at least two adjacent audio blocks in the series of audio blocks 422.

In one example, the sensitive information identification module 450 may combine or merge at least two adjacent audio blocks with the portions of sensitive information 454 to form a composite audio block 424 (e.g., three audio blocks merged together). The adjacent audio blocks may be merged together to form the composite audio block 424 when audio block identifiers validate that the adjacent audio blocks are in fact sequential in time. The composite audio block 424 may be provided to the text representation module 430, which may generate a composite text representation 434 for the composite audio block 424. The metadata generation module 440 may analyze the composite text representation 434 to obtain composite metadata 444 for the composite audio block 424. In addition, the sensitive information identification module 450 may compare the composite text representation 434 to the pattern rules 456 to identify sensitive information 452 in the composite audio block 424. The sensitive information 452 that is identified in the composite audio block 424 may be a complete piece of sensitive information, as opposed to a partial or fragmentary piece of sensitive information that was previously identified. In addition, an audio filtering module 460 may filter the composite audio block 424 to produce a filtered composite audio block 462, which may not include sensitive information 452 or a portion of sensitive information 454. More specifically, a timestamp for the sensitive information 452 may be identified in the composite metadata 444 for the composite audio block 424, and a portion of audio data may be removed from the composite audio block 424 in accordance with the timestamp for the sensitive information 452 in the composite audio block 424.

Generally speaking, as a duration of each audio block 422 decreases, there is an increased likelihood of detecting portions of sensitive information 454, which may increase an amount of complexity involved with merging multiple audio chunks together and analyzing merged audio chunks to detect portions of sensitive information 454. On the other hand, as the duration of each audio block 422 increases, there is a decreased likelihood of detecting portions of sensitive information 454, which may decrease the amount of complexity involved with merging the multiple audio chunks together and analyzing the merged audio chunks to detect portions of sensitive information 454. However, as the duration of each audio block 422 increases, the overall time delay in processing a given audio block 422 to remove sensitive information 452 may be increased.

As a non-limiting example, the sensitive information identification module 450 may determine that adjacent audio blocks 3, 4, 5 and 6 (in a series of audio blocks) each contain fragments or portions of sensitive information 454. In this case, the sensitive information identification module 450 may deduce that an instance of sensitive information (e.g., an utterance of credit card information) extends to four of these adjacent audio blocks (i.e., the sensitive information extends for a period of approximately 6 to 8 seconds, as each audio block may be 2 seconds in duration). The sensitive information identification module 450 may flag each of the four adjacent audio chunks as potentially having portions of sensitive information 454, and the sensitive information identification module 450 may combine the four adjacent audio blocks to form a composite audio block 424 that spans for 8 seconds, and the composite audio block 424 may be reevaluated.

Figure 5:
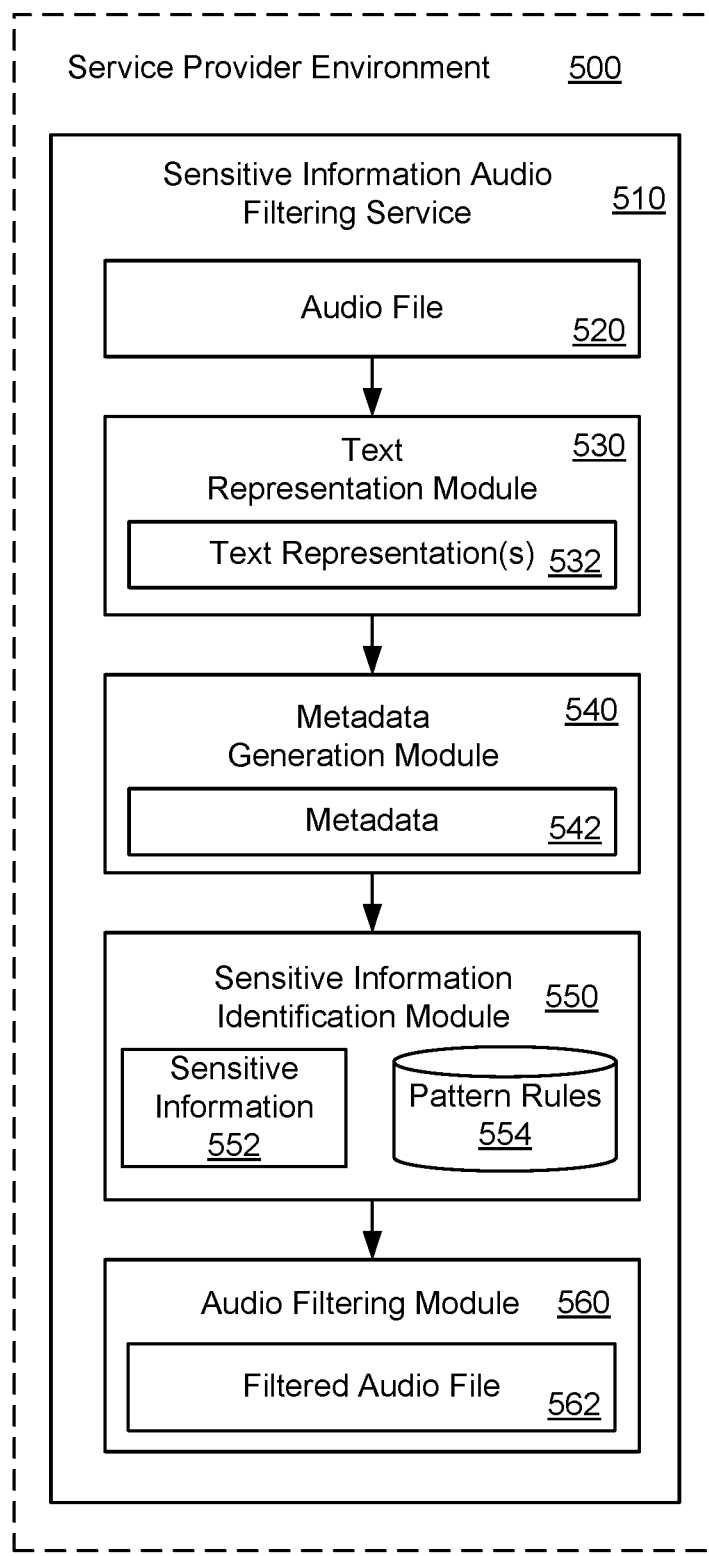
FIG. 5 illustrates a system and related operations for removing sensitive information from an audio file according to an example of the present technology.

FIG. 5 illustrates an exemplary system and related operations for removing sensitive information from an audio file 520 using a sensitive information audio filtering service 510 that operates in a service provider environment 500. The sensitive information audio filtering service 510 may identify the audio file 520. The audio file 520 may represent an audio recording of a previously held conversation between two parties (e.g., a customer service representative and a customer) or a recording from a single party (e.g., a messages to a customer representative). In this configuration, processing of the audio file 520 may be performed after the conversation or message is completed.

In one example, a text representation module 530 in the service provider environment 500 (or a speech-to-text service operating in the service provider environment 500) may generate a text representation 532 of the audio file 520. A metadata generation module 540 may analyze the text representation 532 to generate metadata 542 for the audio file 520. A sensitive information identification module 550 in the sensitive information audio filtering service 510 may compare the text representation 532 for the audio file 520 to pattern rules 554 to identify sensitive information 552, such as personally identifiable information (PII), in the audio file 520. The predefined pattern rules 554 may be appropriately selected based on a context of the conversation. In addition, timestamps for the sensitive information 552 may be recorded in the metadata 542 for the audio file 520. Further, an audio filtering module 560 in the sensitive information audio filtering service 510 may remove or filter portions of audio data from the audio file 520 which correspond to the sensitive information 552 detected in the audio file 520, thereby producing a filtered audio file 562. The audio filtering module 560 may remove the portions of audio data in accordance with the timestamps for the sensitive information 552 included in the audio file 520. The audio filtering module 560 may store the filtered audio file 562 as a single audio file, and the filtered audio file 562 may be available for later consumption.

Figure 6A:
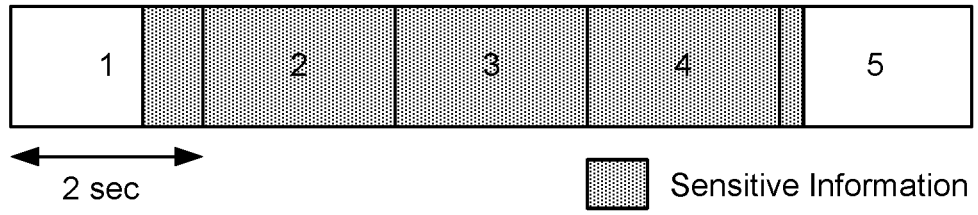
FIGS. 6A to 6D illustrate audio source data that contains sensitive information according to an example of the present technology.
Figure 6B:
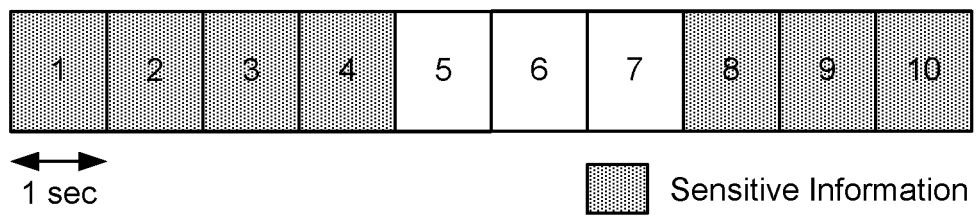
Figure 6C:
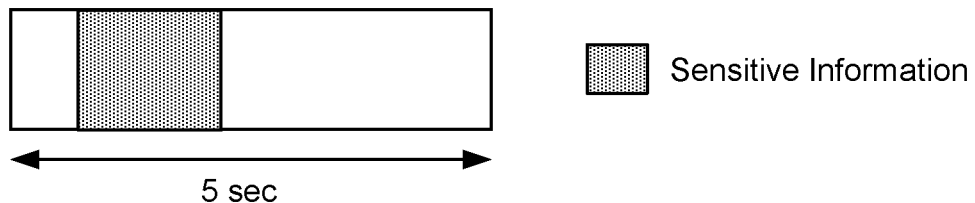
Figure 6D:
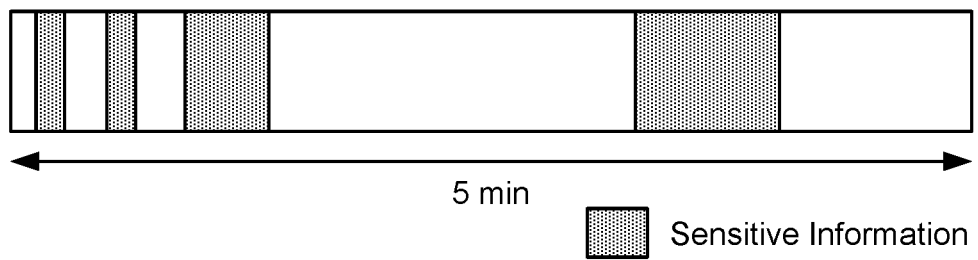

FIGS. 6A to 6D illustrate examples of audio source data that contain sensitive information. The audio source data may be segmented or chunked into individual audio blocks of various time durations, and a portion of an audio block (e.g., audio data in the audio block) or an entire audio block may be marked as containing sensitive information. As shown in FIG. 6A, the audio source data may include a series of audio blocks 610. The series of audio blocks 610 may be sequential audio blocks having a time ordering. In this example, the series of audio blocks 610 may include 5 individual audio blocks, and each individual audio block may have a duration of 2 seconds. In this example, all of audio blocks 2-4 may be flagged or marked as containing sensitive information, whereas a portion of audio blocks 1 and 5 may be flagged as containing sensitive information. Timestamps for audio blocks 1 and 5 may identify a starting location and/or an end location for the sensitive information for the respective audio blocks. As shown in FIG. 6B, a series of audio blocks 620 may include 10 individual audio blocks, and each individual audio block may have a duration of 1 second. In this example, all of audio blocks 1-4 and 8-10 (i.e., not portions of the audio blocks) may be flagged as containing sensitive information, whereas audio blocks 5-7 may be flagged as not containing any sensitive information. As shown in FIG. 6C, an audio block 630 may have a duration of 5 seconds, and a portion of the audio block 630 may be flagged as containing sensitive information (as associated with a timestamp that denotes a starting location and an end location for the sensitive information). As shown in FIG. 6D, an audio file 640 may have a duration of 5 minutes. In this example, multiple instances of sensitive information may be identified in the audio file 640, and each instance of sensitive information may be associated with a timestamp that denotes a starting location and an end location for the sensitive information.

Figure 7:
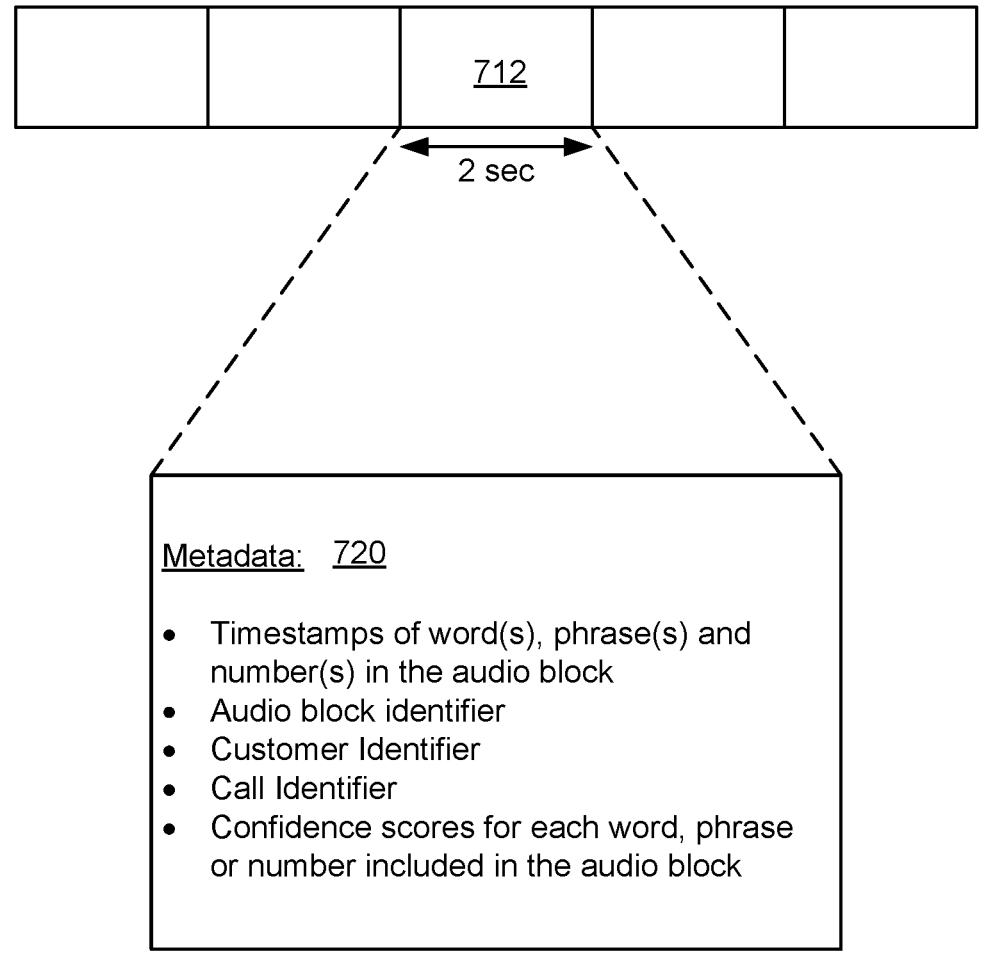
FIG. 7 illustrates metadata associated with an audio block according to an example of the present technology.

FIG. 7 illustrates an example of metadata 720 associated with a given audio block 712 in a series of audio blocks 710. Each audio block 712 in the series of audio blocks may have a duration of 2 seconds. The metadata 720 may include various types of information that characterize the given audio block 712 and/or the audio recording. For example, the metadata 720 may include timestamps for words, phrases and/or numbers in the audio block 712. The metadata 720 may include an audio block identifier, a customer identifier, and a call identifier. In addition, the metadata 720 may include confidence scores for each word, phrase or number included in the audio block 712.

Figure 8:
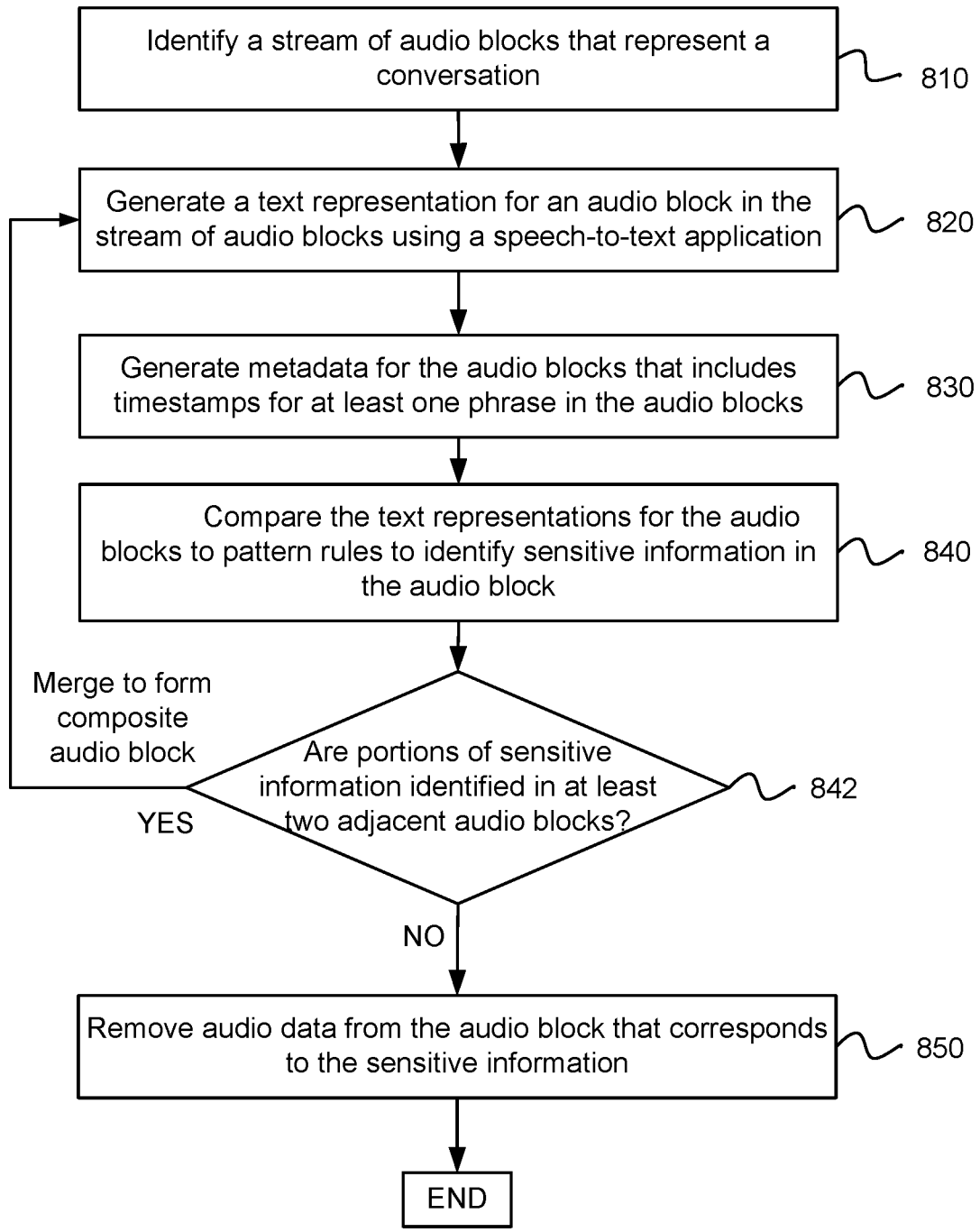
FIG. 8 is a flowchart of an example method for removing personally identifiable information (PII) from audio blocks.

FIG. 8 illustrates an example of a method for removing sensitive information from audio blocks. A stream of audio blocks that represents a conversation may be identified, as in block 810. The stream of audio blocks may represent an ongoing conversation that is occurring between two parties. Each audio block in the stream of audio blocks may represent a certain time period of the ongoing conversation.

A text representation for an audio block in the stream of audio blocks may be generated using a speech-to-text application, as in block 820. The text representation may be a transcript of the conversation that occurred during the corresponding audio block. Thus, the text representation may include, for the corresponding audio block, words, phrases, numbers, etc. that were spoken between parties involved in the conversation.

The text representation for the audio block may be analyzed to generate metadata for the audio block, as in block 830. The metadata may include timestamps for at least one word, phrase and/or number in the audio block, as indicated by the text representation for the audio block. In addition, the metadata for the audio block may further include an audio block identifier, a customer identifier, a call identifier, and/or confidence scores for each word, phrase or number included in the audio block.

The text representation for the audio block may be compared to pattern rules to identify sensitive information (e.g., PII) in the audio block, as in block 840. The pattern rules may identify certain patterns of words, phrases and/or numbers that are indicative of sensitive information. When these certain patterns of words, phrases and/or numbers are detected in the text representation, a corresponding portion of audio data in the audio block may be flagged as being sensitive information. In addition, a timestamp for the sensitive information in the audio block may be identified in the metadata for the audio block.

A portion of the audio data may be removed or filtered from the audio block that corresponds to the sensitive information in the audio block, as in block 850. The portion of the audio data may be removed in accordance with the timestamp for the sensitive information in the audio block. On the other hand, portions of audio data that do not include sensitive information may remain in the audio block.

In one configuration, portions of sensitive information may be identified in at least two adjacent audio blocks, as in block 842. In this case, at least two adjacent audio blocks with the portions of sensitive information may be combined to form a composite audio block. A composite text representation may be generated for the composite audio block. The composite text representation may be analyzed to obtain composite metadata for the composite audio block. The composite metadata may include timestamps for at least one phrase in the composite audio block. The composite text representation may be compared to the pattern rules to identify the sensitive information in the composite audio block. A portion of audio data may be removed from the composite audio block that corresponds to the sensitive information in the composite audio block.

Figure 9:
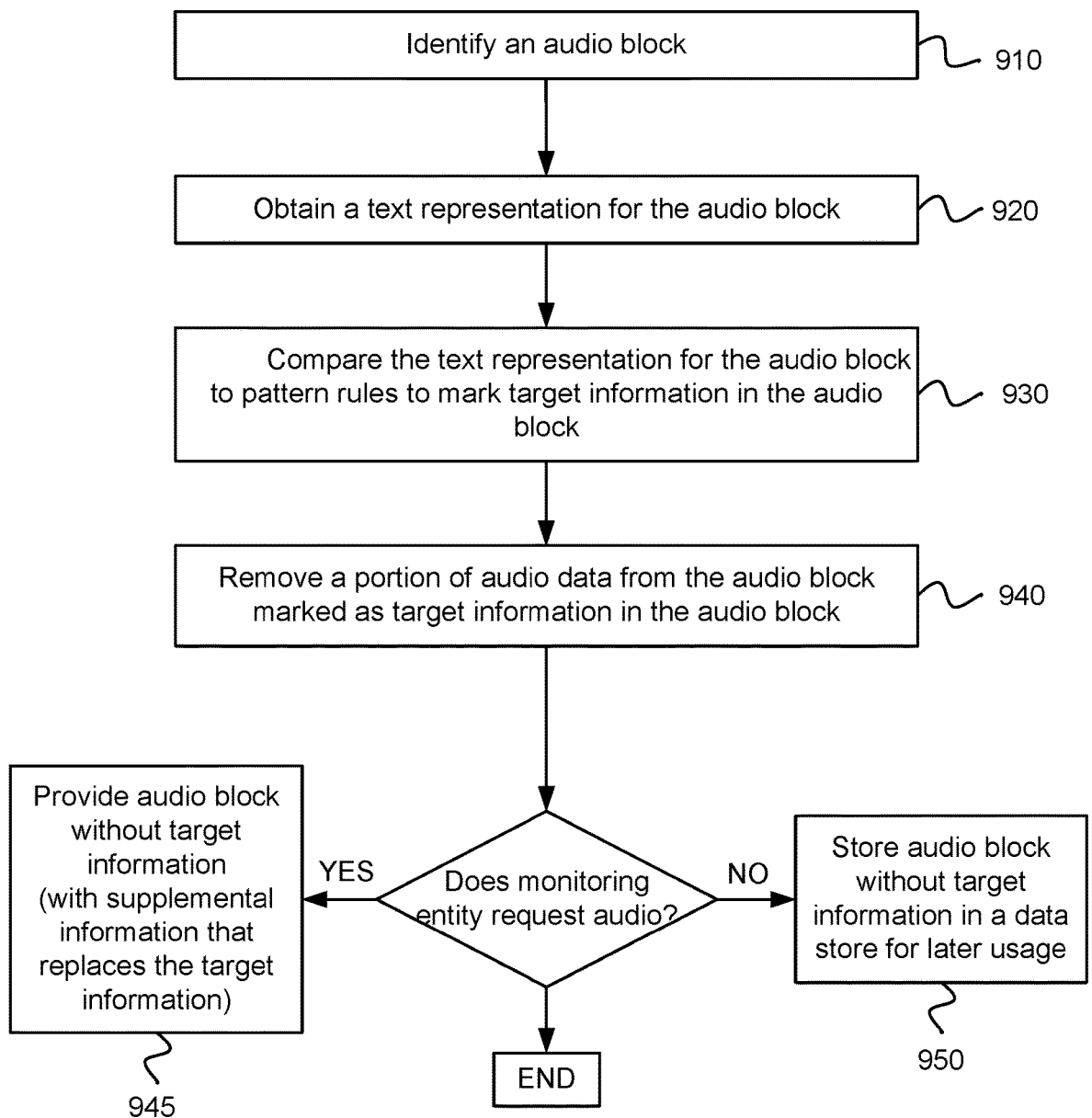
FIG. 9 is a flowchart of an example method for removing sensitive information from an audio block.

FIG. 9 illustrates an example of a method for removing target information (e.g., sensitive information) from an audio block. An audio block may be identified, as in block 910. For example, the audio block may represent a portion of an ongoing conversation between two parties (e.g., a customer service representative and a customer). The audio block may be included in a stream of audio blocks of the conversation between the two parties.

A text representation may be obtained for the audio block, as in block 920. For example, the text representation may be obtained from a speech-to-text service. The text representation may be a transcript of the conversation that occurred during the corresponding audio block. Thus, the text representation may include, for the corresponding audio block, words, phrases, numbers, etc. that were spoken between the parties involved in the conversation.

The text representation for the audio block may be compared to pattern rules to identify sensitive information in the audio block, as in block 930. The sensitive information may be marked or flagged in the audio block by setting a flag in the audio block. The pattern rules may identify certain patterns of words, phrases and/or numbers that have an increased likelihood of being associated with sensitive information.

A portion of the audio data may be removed or filtered from the audio block that corresponds to marked sensitive information in the audio block, as in block 940. Portions of audio data that do not include sensitive information may remain in the audio block. In one example, the audio block without the portion of audio data corresponding to the sensitive information may be provided to the monitoring entity, as in block 945. The monitoring entity may be able to perform quality assurance for the audio stream. The audio block may be provided to the monitoring entity along with supplemental audio data in place of a removed portion of audio data corresponding to the sensitive information. Alternatively, the audio blocks without the portions of audio data corresponding to the sensitive information may be stored as a single audio file in a data store for later usage, as in block 950.

Figure 10:
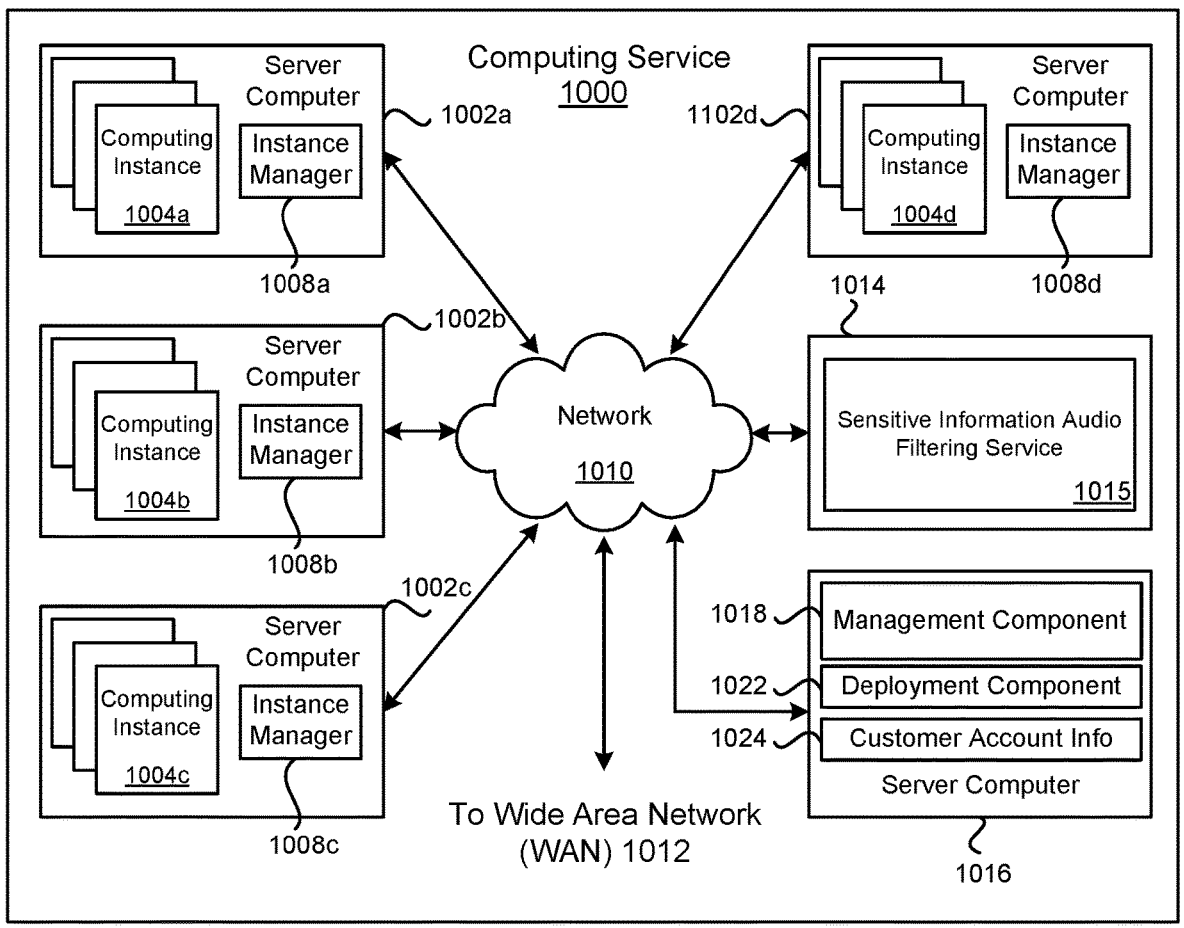
FIG. 10 is a block diagram of a service provider environment according to an example of the present technology.

FIG. 10 is a block diagram illustrating an example computing service 1000 that may be used to execute and manage a number of computing instances 1004a-d upon which the present technology may execute. In particular, the computing service 1000 depicted illustrates one environment in which the technology described herein may be used. The computing service 1000 may be one type of environment that includes various virtualized service resources that may be used, for instance, to host computing instances 1004a-d.

The computing service 1000 may be capable of delivery of computing, storage and networking capacity as a software service to a community of end recipients. In one example, the computing service 1000 may be established for an organization by or on behalf of the organization. That is, the computing service 1000 may offer a "private cloud environment." In another example, the computing service 1000 may support a multi-tenant environment, wherein a plurality of customers may operate independently (i.e., a public cloud environment). Generally speaking, the computing service 1000 may provide the following models: Infrastructure as a Service ("IaaS"), Platform as a Service ("PaaS"), and/or Software as a Service ("SaaS"). Other models may be provided. For the IaaS model, the computing service 1000 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 1000. End customers may access the computing service 1000 using networked client devices, such as desktop computers, laptops, tablets, smartphones, etc. running web browsers or other lightweight client applications, for example. Those familiar with the art will recognize that the computing service 1000 may be described as a "cloud" environment.

The particularly illustrated computing service 1000 may include a plurality of server computers 1002a-d. The server computers 1002a-d may also be known as physical hosts. While four server computers are shown, any number may be used, and large data centers may include thousands of server computers. The computing service 1000 may provide computing resources for executing computing instances 1004a-d. Computing instances 1004a-d may, for example, be virtual machines. A virtual machine may be an instance of a software implementation of a machine (i.e. a computer) that executes applications like a physical machine. In the example of a virtual machine, each of the server computers 1002a-d may be configured to execute an instance manager 1008a-d capable of executing the instances. The instance manager 1008a-d may be a hypervisor, virtual machine manager (VMM), or another type of program configured to enable the execution of multiple computing instances 1004a-d on a single server. Additionally, each of the computing instances 1004a-d may be configured to execute one or more applications.

A server 1014 may be reserved to execute software components for implementing the present technology or managing the operation of the computing service 1000 and the computing instances 1004a-d. For example, the server computer 1014 may execute a sensitive information audio filtering service 1015 operable to remove sensitive information. The sensitive information audio filtering service 1015 may receive audio blocks of a conversation. The sensitive information audio filtering service 1015 may obtain a text representation for an audio block in the audio blocks using a speech-to-text application. The sensitive information audio filtering service 1015 may analyze the text representation for the audio block to generate metadata for the audio block, and the metadata may include timestamps for at least one phrase in the audio block. The sensitive information audio filtering service 1015 may compare the text representation for the audio block to pattern rules to identify sensitive information in the audio block, and a timestamp for the sensitive information may be identified in the metadata for the audio block. The sensitive information audio filtering service 1015 may remove a portion of audio data from the audio block that corresponds to the sensitive information in the audio block, and the portion of audio data may be removed in accordance with the timestamp for the sensitive information in the audio block.

A server computer 1016 may execute a management component 1018. A customer may access the management component 1018 to configure various aspects of the operation of the computing instances 1004a-d purchased by a customer. For example, the customer may setup computing instances 1004*a-d* and make changes to the configuration of the computing instances 1004*a-d*.

A deployment component 1022 may be used to assist customers in the deployment of computing instances 1004*a-d*. The deployment component 1022 may have access to account information associated with the computing instances 1004*a-d*, such as the name of an owner of the account, credit card information, country of the owner, etc. The deployment component 1022 may receive a configuration from a customer that includes data describing how computing instances 1004*a-d* may be configured. For example, the configuration may include an operating system, provide one or more applications to be installed in computing instances 1004*a-d*, provide scripts and/or other types of code to be executed for configuring computing instances 1004*a-d*, provide cache logic specifying how an application cache is to be prepared, and other types of information. The deployment component 1022 may utilize the customer-provided configuration and cache logic to configure, prime, and launch computing instances 1004*a-d*. The configuration, cache logic, and other information may be specified by a customer accessing the management component 1018 or by providing this information directly to the deployment component 1022.

Customer account information 1024 may include any desired information associated with a customer of the multi-tenant environment. For example, the customer account information may include a unique identifier for a customer, a customer address, billing information, licensing information, customization parameters for launching instances, scheduling information, etc. As described above, the customer account information 1024 may also include security information used in encryption of asynchronous responses to API requests. By "asynchronous" it is meant that the API response may be made at any time after the initial request and with a different network connection.

A network 1010 may be utilized to interconnect the computing service 1000 and the server computers 1002*a-d*, 1016. The network 1010 may be a local area network (LAN) and may be connected to a Wide Area Network (WAN) 1012 or the Internet, so that end customers may access the computing service 1000. In addition, the network 1010 may include a virtual network overlaid on the physical network to provide communications between the servers 1002*a-d*. The network topology illustrated in FIG. 10 has been simplified, as many more networks and networking devices may be utilized to interconnect the various computing systems disclosed herein.

Figure 11:
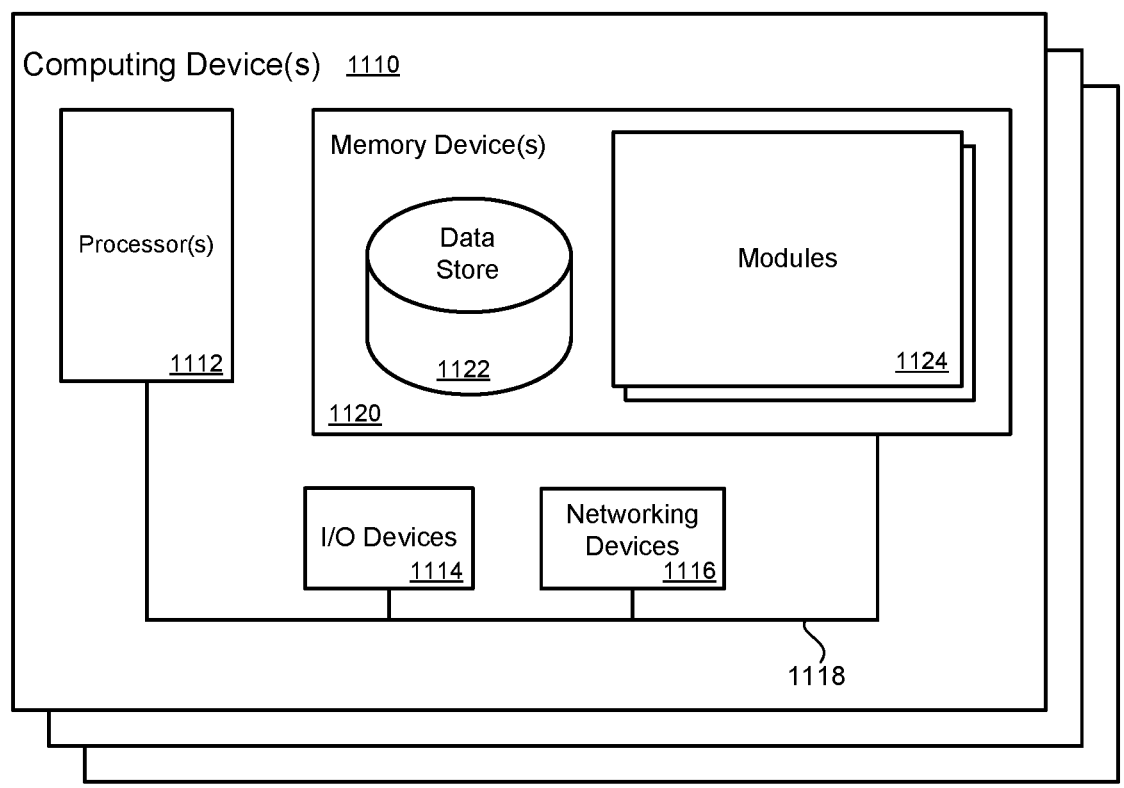
FIG. 11 is a block diagram that provides an example illustration of a computing device that may be employed in the present technology.

FIG. 11 illustrates a computing device 1110 on which modules of this technology may execute. A computing device 1110 is illustrated on which a high level example of the technology may be executed. The computing device 1110 may include one or more processors 1112 that are in communication with memory devices 1120. The computing device may include a local communication interface 1118 for the components in the computing device. For example, the local communication interface may be a local data bus and/or any related address or control busses as may be desired.

The memory device 1120 may contain modules 1124 that are executable by the processor(s) 1112 and data for the modules 1124. The modules 1124 may execute the functions described earlier. A data store 1122 may also be located in the memory device 1120 for storing data related to the modules 1124 and other applications along with an operating system that is executable by the processor(s) 1112.

Other applications may also be stored in the memory device 1120 and may be executable by the processor(s) 1112. Components or modules discussed in this description that may be implemented in the form of software using high programming level languages that are compiled, interpreted or executed using a hybrid of the methods.

The computing device may also have access to I/O (input/output) devices 1114 that are usable by the computing devices. An example of an I/O device is a display screen that is available to display output from the computing devices. Other known I/O device may be used with the computing device as desired. Networking devices 1116 and similar communication devices may be included in the computing device. The networking devices 1116 may be wired or wireless networking devices that connect to the internet, a LAN, WAN, or other computing network.

The components or modules that are shown as being stored in the memory device 1120 may be executed by the processor 1112. The term "executable" may mean a program file that is in a form that may be executed by a processor 1112. For example, a program in a higher level language may be compiled into machine code in a format that may be loaded into a random access portion of the memory device 1120 and executed by the processor 1112, or source code may be loaded by another executable program and interpreted to generate instructions in a random access portion of the memory to be executed by a processor. The executable program may be stored in any portion or component of the memory device 1120. For example, the memory device 1120 may be random access memory (RAM), read only memory (ROM), flash memory, a solid state drive, memory card, a hard drive, optical disk, floppy disk, magnetic tape, or any other memory components.

The processor 1112 may represent multiple processors and the memory 1120 may represent multiple memory units that operate in parallel to the processing circuits. This may provide parallel processing channels for the processes and data in the system. The local interface 1118 may be used as a network to facilitate communication between any of the multiple processors and multiple memories. The local interface 1118 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions being executable by one or more processors to perform acts comprising:
    obtaining a text representation for a first audio block in a stream of audio blocks using a speech-to-text application, wherein the stream of audio blocks represents a conversation between at least two persons;
    analyzing the text representation for the first audio block to generate metadata for the first audio block, wherein the metadata includes timestamps for at least one phrase in the first audio block;
    comparing the text representation for the first audio block to pattern rules to identify a first portion of sensitive information in the first audio block, wherein a timestamp for the first portion of the sensitive information is identified in the metadata for the first audio block;
    determining that the sensitive information extends into a second portion of sensitive information in an adjacent audio block in the stream of audio blocks;
    combining the first audio block with the adjacent audio block to form a composite audio block; and
    removing a portion of audio data from the composite audio block that corresponds to the first portion of sensitive information in the first audio block and the second portion of sensitive information in the adjacent audio block while the conversation is occurring between the at least two persons, wherein the portion of audio data is removed in accordance with the timestamp for the first portion of sensitive information in the first audio block and a second timestamp for the second portion of sensitive information in the adjacent audio block.

2. The non-transitory machine readable storage medium of claim 1, the acts further comprising providing the composite audio block without the portion of audio data to a monitoring entity, wherein the monitoring entity is able to perform quality assurance for the conversation.

3. The non-transitory machine readable storage medium of claim 1, wherein the metadata for the first audio block further includes at least one of: an audio block identifier, a customer identifier, a call identifier, or confidence scores for each word, phrase or number included in the first audio block.

4. A method, using one or more processors, comprising:
    obtaining a text representation for a first audio block in a stream of audio blocks using a speech-to-text process, wherein the stream of audio blocks represents a conversation between at least two persons;
    comparing the text representation for the first audio block to pattern rules to identify a first portion of target information in the first audio block;
    marking the first portion of the target information in the first audio block;

determining that the target information extends into a second portion of sensitive information in an adjacent audio block in the stream of audio blocks;

combining the first audio block with the adjacent audio block to form a composite audio block; and removing a portion of audio data from the composite audio block marked as the first portion of target information and the second portion of target information in the adjacent audio block while the conversation is occurring between the at least two persons.

5. The method of claim 4, further comprising providing the composite audio block without the portion of audio data to a monitoring entity.

6. The method of claim 4, further comprising providing the composite audio block along with supplemental audio data in place of the portion of audio data removed from the composite audio block.

7. The method of claim 4, further comprising:

removing audio data from a plurality of audio blocks that contain portions of target information; and storing the plurality of audio blocks without the portions of target information as a single audio file.

8. The method of claim 4, further comprising analyzing the text representation for the first audio block to generate metadata for the first audio block, wherein the metadata includes at least one of: timestamps for at least one phrase in the first audio block, an audio block identifier, a customer identifier, a call identifier, or confidence scores for each word, phrase or number included in the first audio block.

9. The method of claim 4, wherein the portion of target information includes a portion of personally identifiable information (PII) of a person associated with the first audio block, wherein the PII includes at least one of: a name, an address, a telephone number, an email address, a credit card number, a social security number, or payment information.

10. The method of claim 4, wherein the pattern rules are configured to identify a plurality of predefined words, phrases, or numbers that have an increased likelihood of being associated with the first portion of target information, or a plurality of predefined words and phrases that have an increased likelihood of being immediately followed by the first portion of target information.

11. The method of claim 4, further comprising verifying accuracy of the first portion of target information by comparing the first portion of target information to a data store of known target information.

12. The method of claim 4, further comprising selecting the pattern rules depending on a context of the first audio block.

13. The method of claim 4, further comprising deleting metadata for the first audio block after the portion of audio data has been removed.

14. A system, comprising:

at least one processor;

at least one memory device including a data store to store a plurality of data and instructions that, when executed, cause the system to:

receive a first audio blocks in a stream of audio blocks that represents a conversation between at least two persons;

generate a text representation of the first audio blocks using a speech-to-text service;

analyze the text representation to generate metadata for the first audio blocks, wherein the metadata includes a timestamp for a phrase in the first audio blocks;

compare the text representation to pattern rules to identify a first portion of sensitive information in the first audio blocks, wherein the timestamp for the first portion of the sensitive information is identified in the metadata for the first audio blocks;

determine that the sensitive information extends into a second portion of sensitive information in an adjacent audio block in the stream of audio blocks;

combine the first audio block with the adjacent audio block to form a composite audio block; and remove a portion of audio data from the composite audio blocks that contains the first portion of sensitive information and the second portion of sensitive information while the conversation is occurring between the at least two persons.

15. The system of claim 14, wherein the plurality of data and instructions, when executed, cause the system to store the stream of audio blocks, without the portion of audio data, as a single audio file.

16. The system of claim 14, wherein the metadata for the first audio blocks further includes at least one of: a customer identifier, a call identifier, or confidence scores for each word, phrase, or number included in the first audio blocks.

17. The system of claim 14, wherein the plurality of data and instructions, when executed, cause the system to select the pattern rules depending on a type of sensitive information to be identified from the first audio blocks.

18. The system of claim 14, wherein the plurality of data and instructions, when executed, cause the system to providing the composite audio block without the portion of audio data to a monitoring entity.

19. The system of claim 14, wherein the plurality of data and instructions, when executed, cause the system to provide the composite audio block along with supplemental audio data in place of the portion of audio data removed from the composite audio block.

20. The system of claim 14, wherein the plurality of data and instructions, when executed, cause the system to verify accuracy of the first portion of sensitive information by comparing the first portion of sensitive information to a data store of known sensitive information.

* * * * *